(12) United States Patent
Weik et al.

(10) Patent No.: US 6,570,979 B2
(45) Date of Patent: *May 27, 2003

(54) COMPATIBILITY SERVER WITH IN-SUPPORTED TELEPHONE NUMBER PORTABLILITY

(75) Inventors: Hartmut Weik, Stuttgart (DE); Wolfgang Lautenschlager, Weissach-Flacht (DE)

(73) Assignee: Alcatel Alstholm Compagnie Generale d'Electricite, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 233 days.

(21) Appl. No.: 09/133,829

(22) Filed: Aug. 13, 1998

(65) Prior Publication Data

US 2001/0043695 A1 Nov. 22, 2001

(30) Foreign Application Priority Data

Sep. 6, 1997 (DE) .......................... 197 39 016

(51) Int. Cl.[7] .................... H04M 7/00; H04M 11/00
(52) U.S. Cl. ............... 379/230; 379/221.08; 379/93.01
(58) Field of Search ................. 379/230, 229, 379/201.01–201.12, 207.01–207.16, 219, 220.01, 221.01–221.15, 142.01–142.18, 93.01, 93.09

(56) References Cited

U.S. PATENT DOCUMENTS

| | | | |
|---|---|---|---|
| 5,467,390 A | * 11/1995 | Brankley et al. | ........... 379/229 |
| 5,513,250 A | * 4/1996 | McAllister | ............... 379/91.02 |
| 5,533,106 A | * 7/1996 | Blumhardt | ................. 379/142 |
| 5,583,920 A | * 12/1996 | Wheeler, Jr. | ............. 379/88.01 |
| 5,812,639 A | * 9/1998 | Bartholomew et al. | ..... 370/352 |
| 5,812,640 A | * 9/1998 | Chawla et al. | ........... 379/88.19 |
| 5,878,127 A | * 3/1999 | Fleischer, III | ............... 379/220 |

FOREIGN PATENT DOCUMENTS

| | | |
|---|---|---|
| DE | 19515856 | 10/1996 |
| DE | 19521901 | 12/1996 |
| EP | 0717545 | 12/1995 |
| WO | 9608909 | 3/1996 |

* cited by examiner

Primary Examiner—Benny Q. Tieu
(74) Attorney, Agent, or Firm—Ware, Fressola, Van Der Sluys & Adolphson

(57) ABSTRACT

A method and apparatus for establishing a connection from a calling A-subscriber to a called B-subscriber in a telecommunications TC network that offers IN (=Intelligent Network) services, in particular in a multi-operator environment with IN-supported telephone number portability, is characterized in that upon determination of the target address of the called B-subscriber, a service requested for the current call by the calling A-subscriber is simultaneously compared to a stored service profile of the called B-subscriber and in the event of a determined incompatibility, a corresponding negative release message is sent to the calling A-subscriber. This permits the calling A-subscriber, before a possibly pointless connection is made to a called B-subscriber, who does not offer the services desired by the A-subscriber at all, to not even make the connection in the first place, which would be pointless for the calling A-subscriber.

22 Claims, 1 Drawing Sheet

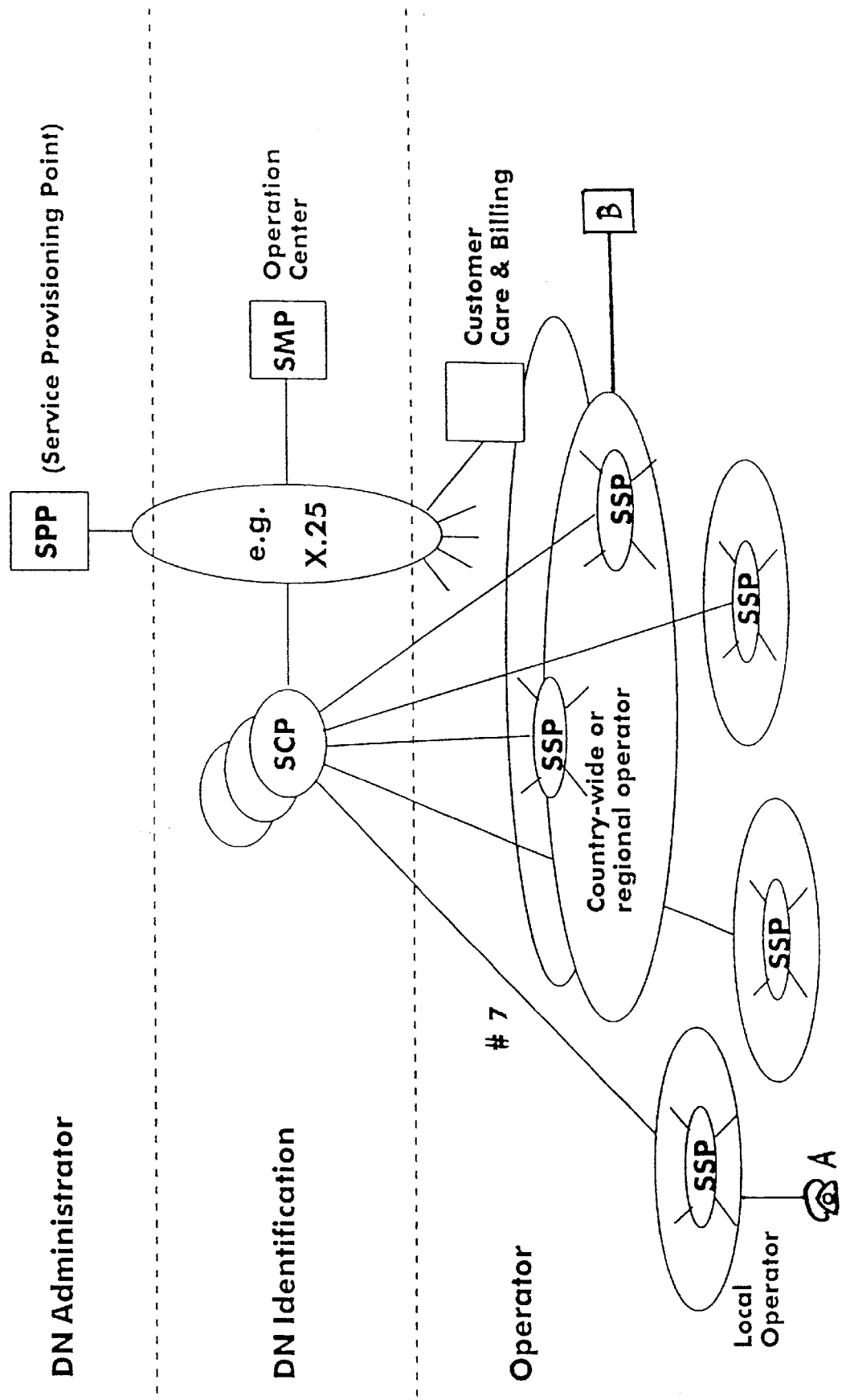

COMPATIBILITY SERVER WITH IN-SUPPORTED TELEPHONE NUMBER PORTABLILITY

BACKGROUND OF THE INVENTION

1. Technical Field

The invention relates to a method and a device for establishing a connection from a calling A-subscriber to a called B-subscriber in a telecommunication (TC) network that offers IN (=Intelligent Network) services, in particular in a multi-operator environment with IN-supported telephone number portability.

2. Discussion of Related Art

A connection establishing method of this kind as well as a corresponding device have been disclosed by DE 195 15 856 A1.

In order to establish a connection between a calling and a called subscriber in a TC network, first the calling A-subscriber dials a telephone number that is associated with the called B-subscriber. This telephone number is carried in the call and serves the switching centers in the locating of the called subscriber.

For some time, IN services (IN=Intelligent Network) have been offered in TC networks, for example services which, with telephone numbers with particular service codes (placed before the telephone number), can be requested by calling network subscribers. The access to an IN service in the TC network is permitted by a large number of service switching points (SSP=service switching point) that each communicate with a central control logic, the service control point (SCP=service control point). The call, which is triggered by means of the dialing of a number by the A-subscriber, is transmitted to the nearest service switching point, which, from the number comprised of a service code and a telephone number to be converted, takes the latter from the call, and sends it to the primary service control point. Then, the service switching point receives the converted telephone number from the service control point, with corresponding routing information so that the call can be forwarded to this telephone number.

DE 195 21 901 A1 describes a communication system for voice-controlled activation of services with a switching center for more convenient dialing of a called B-subscriber, wherein the switching center is connected to a number of subscriber stations and a server with a voice recognition device and control means for ordering the activation of services.

DE 195 15 856 A1, which was cited at the beginning, describes a method for establishing a connection, with UPT (universal personal telecommunication) features and automatic forwarding to the called B-subscriber at a telephone number at which he can actually be reached at this moment.

For a calling A-subscriber, who would like to request a particular service offered in the TC network, though, there is the problem that possibly, only after finishing establishment of a connection, when the connection to the called B-subscriber has been made, does the A-subscriber determine that the latter does not even offer the requested service. In particular in a multi-operator environment with telephone number portability, with a foreseeable increasing number of private TC networks, the problem will increase considerably in future since the requesting A-subscriber will be confronted with an ever increasing number of service-providing B-subscribers whose individual offerings he will no longer have a detailed overview of.

SUMMARY OF INVENTION

The object of the current invention, therefore, is to introduce a method and a device for establishing a connection, with the features mentioned at the beginning, which, before making a possibly pointless connection to a called B-subscriber, who does not offer the services desired by the A-subscriber at all, permit the calling A-subscriber to not even make the connection in the first place, which would be useless for the calling A-subscriber.

According to the invention, this object is attained by virtue of the fact that upon determination of the target address of the called B-subscriber, a service requested for the current call by the calling A-subscriber is compared to a stored service profile of the called B-subscriber and in the event of a determined incompatibility, a corresponding negative release message is sent to the calling A-subscriber. During the establishment of the call, since the TC network immediately detects a possible incompatibility and communicates it to the calling A-subscriber, this calling A-subscriber can block a pointless connection ahead of time.

Preferably, the breaking off of the establishment of a connection when there is a lack of compatibility can also be automatically carried out by the TC network.

It is also advantageous if the TC network maintains a property profile of both the calling A-subscriber and the possible called B-subscribers so that during the establishment of a connection, by comparing the corresponding property profiles, a determination can be made as to whether in addition to the service profile of the called B-subscriber, other reasons cannot also be in keeping with completely ending the establishment of a connection. A property profile of this kind can contain, for example, information such as the fact that only fax, modem, or telephone connections should be established. Preferably, the property profiles of subscribers are stored in the respectively appropriate subscriber switching center by way of which the subscriber obtains access to the TC network.

In the event that the system determines that particular properties of the property profiles belonging to the calling A-subscriber and the called B-subscriber are compatible, then it can also automatically select a route adapted to the corresponding property profile of the A-subscriber, for example the establishment of an exclusively desired fax connection.

The scope of the invention also includes a device for carrying out the method according to the invention, which is distinguished by virtue of the fact that in a TC network, a large number of subscriber switching centers are provided, which can in particular also be service switching points and via which the subscribers can gain access to the network, that at least one primary service control point in the form of a server is provided, by way of which a connection between a calling A-subscriber and a called B-subscriber is established over the respectively appropriate service switching point, and that in the service control point, a service profile of the is called B-subscriber, which profile is stored in its appropriate subscriber switching center, or in the appropriate service switching center, or in the service control point itself, can be compared for compatibility with the service requested by the calling A-subscriber, by means of a logic circuit.

Preferably, a property profile of the respective TC subscriber is also stored in the appropriate subscriber switching center or in the appropriate service switching point or in the service control point. In the service control point, then, during the establishment of a connection, by means of a suitable logic circuit, the property profile of the respective calling A-subscriber can be compared with that of the called B-subscriber, and a corresponding connection path can be selected or the establishment of the connection can be automatically broken off.

Other advantages of the invention ensue from the description and the drawing. Likewise, the above-mentioned and further explained features can, according to the invention, each be used individually or can additionally be used in arbitrary combinations. The embodiments shown and described are not understood to be a conclusive enumeration, but rather have an exemplary character for describing the invention.

BRIEF DESCRIPTION OF THE DRAWING

The invention is represented in the drawing by the sole FIGURE and will be explained in more detail in conjunction with an exemplary embodiment.

DETAILED DESCRIPTION OF PREFERRED EMBODIMENTS

The sole FIGURE shows the design principle of a telecommunication (TC) network, in which IN services can be offered, wherein a service control point (SCP=Service Control Point) is used as a compatibility server.

A calling A-subscriber in the region of a local operator obtains access to the TC network by way of a subscriber switching center or a service switching point (SSP=Service Switching Point) by dialing a number. After this, the SSP sends an IN inquiry to a primary SCP, in which inquiry, in addition to the actual telephone number of the B-subscriber called by the A-subscriber now according to the invention, a signal is also sent along with it, encoded as a parameter, and this signal is characteristic for the service requested by the A-subscriber. In addition to the usual routing information, a service profile of the B-subscriber is now also maintained in the SCP, which is either stored in the SCP itself or which the SCP obtains from the appropriate SSP of the called B-subscriber.

By means of the signal, which is characteristic for the requested service, now a compatibility comparison with the service profile of the called B-subscriber is conducted. If there is no compatibility, i.e. the called B-subscriber does not support the requested service at all, then the A-subscriber is sent a negative release message by way of his appropriate SSP. The establishment of a connection can now either be broken off automatically or can be broken off at the decision of the A-subscriber, before a connection to the B-subscriber is made. In the event of an automatic breaking off of the establishing of a connection, the calling A-subscriber can be sent a corresponding indication. As a result, pointless connections can be blocked ahead of time.

Advantageously, an expanded property profile of the respective subscriber can also be respectively stored in the appropriate subscriber switching center, in the appropriate SSP, or in the primary SCP, which property profile can, for example, contain instructions that only fax, modem, or telephone connections should be made. During the establishing of a connection, the property profile of the calling A-subscriber can then be compared to that of the called B-subscriber. If no compatibility is possible, then a negative release message can likewise be sent to the calling A-subscriber and the establishing of the connection can be automatically broken off.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for establishing a call connection from a calling A-subscriber to a called B-subscriber in a telecommunication (TC) network that offers intelligent network (IN) services, in particular in a multi-operator environment with IN-supported telephone number portability, characterized in that, upon determination of a target address of the called B-subscriber, a service, which is requested by the calling A-subscriber for establishment after connecting the current call, is compared to a stored service profile of the called B-subscriber in order to automatically determine whether the service requested is supported by B-subscriber, and in the event of a determined incompatibility, a corresponding negative release message is sent to the calling A-subscriber, whereupon the TC network breaks off establishment of the connection before the current call is connected, wherein the service requested for the current call by the calling A-subscriber is characterized by a parameter sent along with the current call.

2. The method according to claim 1, characterized in that at a service switching point (SSP) of a local operator (LO), the A-subscriber dials the telephone number of the B-subscriber, who is not in the region of this local operator (LO), that the service switching point (SSP) of the A-subscriber sends an IN inquiry to a primary service control point (SCP), in which, as an additional parameter, a signal that is characteristic of a service requested by the A-subscriber is transmitted as well, that a service profile of the B-subscriber is stored in the service control point (SCP) or in the service switching point (SSP) of the called B-subscriber, which profile is compared for compatibility with the signal that is characteristic of the service requested by the A-subscriber, and that when there is a lack of compatibility, the negative release message is sent from the service control point (SCP) to the A-subscriber by way of the service switching point (SSP) of the A-subscriber.

3. The method according to claim 1, characterized in that when there is a lack of compatibility, the continuing establishment of a connection to the called B-subscriber is immediately broken off automatically.

4. The method according to claim 1, characterized in that a property profile of the calling A-subscriber including instructions that only fax, modem, or telephone connections should be made, is stored in the subscriber switching center, by way of which the A-subscriber obtains access to the TC network, that during the establishment of a connection, the corresponding property profile of the called B-subscriber is compared to that of the A-subscriber, and that in the event of incompatibility, a negative release message is sent to the A-subscriber.

5. The method according to claim 4, characterized in that in the event of possible compatibility of the property profiles, a path that corresponds to the property profile of the A-subscriber is selected.

6. The method of claim 1, wherein the call connection is automatically established if the called B-subscriber supports the service requested by the calling A-subscriber.

7. The method of claim 1, wherein the TC network uses only one service profile during the establishment of the connection, and wherein the one service profile is the service profile of the called B-subscriber.

8. Apparatus within a telecommunications (TC) network for establishing a call from a calling A-subscriber to a called B-subscriber, comprising:

subscriber switching centers, including service switching points (SSP), responsive to calling subscribers, for enabling calling subscribers to access the TC network;

at least one primary service control point (SCP) in the form of a server, located within the TC network, responsive to a calling A-subscriber, for establishing a connection from the calling A-subscriber to the called B-subscriber by way of an appropriate SSP;

a service profile of B-subscriber stored in the TC network, accessible in response to a calling A-subscriber, for providing data about the compatibility of B-subscriber with service requested by A-subscriber for establishment after connecting the call;

a logic circuit located in the SCP, responsive to data output from the service profile of B-subscriber and also responsive to the service request from A-subscriber, for automatically determining if the service requested by A-subscriber is compatible with the service profile of B-subscriber; and a means for breaking off the establishment of the connection before the call is connected, in response to an incompatibility signal from the logic circuit, wherein the service requested for the current call by the calling A-subscriber is characterized by a parameter sent along with the current call.

9. The apparatus as in claim 8, further comprising a property profile of each subscriber, both property profiles being stored in the TC network, both being responsive to the call placed by A-subscriber, and both providing requests as to whether fax, modem, and telephone connections should be made.

10. The apparatus as in claim 9, wherein the logic circuit compares the property profiles and selects a corresponding connection path if a compatible path is available.

11. The apparatus of claim 8, wherein the call connection is automatically established if the called B-subscriber supports the service requested by the calling A-subscriber.

12. The apparatus of claim 8, wherein the TC network uses only one service profile during the establishment of the connection, and wherein the one service profile is the service profile of the called B-subscriber.

13. A method for checking compatibility and establishing a connection from a calling A-subscriber to a called B-subscriber in a telecommunications (TC) network that offers intelligent network (IN) services, in particular in a multi-operator environment with IN-supported telephone number portability, comprising the steps of:

determining a target address of the called B-subscriber;

comparing a service, requested for the current call by the calling A-subscriber for establishment after connecting the current call, to a stored service profile of the called B-subscriber;

sending a negative release message to the calling A-subscriber in the event of a determined incompatibility; and breaking off the establishment of the connection, wherein the service requested for the current call by the calling A-subscriber is characterized by a parameter sent along with the current call.

14. The method according to claim 13, further comprising the steps of:

determining, from the telephone number of B-subscriber dialed by A-subscriber, that B-subscriber is out of range of A-subscriber's local operator (LO);

sending an IN inquiry from the service switching point (SSP) of the A-subscriber to a primary service control point (SCP);

including in the inquiry to the SCP, as an additional parameter, a signal that is characteristic of a service requested by the A-subscriber;

comparing, for compatibility, the service requested by the A-subscriber with the stored service profile of B-subscriber, subscriber profiles being stored at SCPs, as well as at SSPs of subscribers; and sending a negative release message from the SCP to the SSP of A-subscriber, if there is a lack of compatibility, for further transmittal of that message to A-subscriber.

15. The method according to claim 13, further comprising the step of automatically breaking off the establishment of a connection to the called B-subscriber, when there is a lack of compatibility.

16. The method according to claim 13, further comprising the steps of:

compiling a property profile of A-subscriber, including instructions about whether fax, modem, and telephone connections should be made;

storing the property profile of A-subscriber in the subscriber switching center, by way of which the A-subscriber obtains access to the TC connection;

comparing, during the establishment of a connection, the compatibility of the property profile of the calling A-subscriber with the corresponding property profile of the called B-subscriber; and sending a negative release message to A-subscriber in the event of incompatibility.

17. The method according to claim 16, further comprising the step of selecting a path that corresponds to the property profile of the A-subscriber, in the event of possible compatibility of the property profiles.

18. The method of claim 13, wherein the call connection is automatically established if the called B-subscriber supports the service requested by the calling A-subscriber.

19. The method of claim 13, wherein the TC network uses only one service profile during the establishment of the connection, and wherein the one service profile is the service profile of the called B-subscriber.

20. A method for establishing a connection from a calling A-subscriber to a called B-subscriber in a telecommunication (TC) network that offers intelligent network (IN) services, in particular in a multi-operator environment with IN-supported telephone number portability, characterized in that:

upon determination of the target address of the called B-subscriber, a service requested for the current call by the calling A-subscriber is compared to a stored service profile of the called B-subscriber, and in the event of a determined incompatibility, a corresponding negative release message is sent to the calling A-subscriber, whereupon the TC network breaks off the establishment of the connection before the call is connected if the call is blocked by the calling A-subscriber only.

21. The method of claim 20, wherein the service requested by A-subscriber is selected from a plurality of services.

22. A method for establishing a connection from a calling A-subscriber to a called B-subscriber in a telecommunication (TC) network that offers intelligent network services, in particular in a multi-operator environment with IN-supported telephone number portability, characterized in that upon determination of the target address of the called B-subscriber, a service requested for the current call by the calling A-subscriber is compared stored service profile of the called B-subscriber, and in the event of a determined incompatibility, a corresponding negative release message is sent to the calling A-subscriber, whereupon the TC network breaks off the establishment of the connection before the call is connected, wherein the service requested by the calling A-subscriber is compared to the stored service profile of the called B-subscriber simultaneously with determination of the target address of the called B-subscriber.

* * * * *